United States Patent

Aoki et al.

[11] Patent Number: 4,716,945
[45] Date of Patent: Jan. 5, 1988

[54] RECORDING INSTRUMENT INK-PATH TREATMENT PROCESS

[75] Inventors: Seiichi Aoki; Tadayoshi Inamoto, both of Machida; Masami Kasamoto, Hiratsuka, all of Japan

[73] Assignee: Canon Kabushiki Kaisha, Tokyo, Japan

[21] Appl. No.: 835,424

[22] Filed: Mar. 3, 1986

Related U.S. Application Data

[63] Continuation of Ser. No. 617,926, Jun. 6, 1984, abandoned.

[51] Int. Cl.⁴ .................. B65B 31/02; G01D 15/16
[52] U.S. Cl. .......................... 141/1; 141/20.5; 346/75; 346/140 R; 346/140 A
[58] Field of Search .............. 346/75, 140 R, 140 A; 141/1, 20.5

[56] References Cited

U.S. PATENT DOCUMENTS

| | | | |
|---|---|---|---|
| 4,272,773 | 6/1981 | Halasz | 346/140 R |
| 4,451,619 | 5/1984 | Heilmann et al. | 525/379 |
| 4,587,999 | 5/1986 | Boiko et al. | 141/1 |

OTHER PUBLICATIONS

Hawley, The Condensed Chemical Dictionary, 8th Ed., (1971), 79, 121, 425.

Primary Examiner—Clifford C. Shaw
Assistant Examiner—Gerald E. Preston
Attorney, Agent, or Firm—Fitzpatrick, Cella, Harper & Scinto

[57] ABSTRACT

A recording instrument comprises a recording device for recording with an ink, an ink storage container and an ink supplying system for supplying ink from the ink storage container to the recording device characterized in that the ink supplying system has a liquid contacting surface comprising at least one of the components in a dye or at least one compound having at least one hydrophilic group, adsorbed on or penetrated into the surface.

16 Claims, 4 Drawing Figures

RECORDING INSTRUMENT INK-PATH TREATMENT PROCESS

This application is a continuation of application Ser. No. 617,926 filed June 6, 1984, now abandoned.

BACKGROUND OF THE INVENTION

1. Field of the Invention

This invention relates to a recording instrument which performs recording by use of an ink (recording liquid), and particularly to a recording instrument that has an ink supplying system with a liquid contacting surface subjected to ink affinity imparting treatment with a compound having hydrophilic groups or a dye solution. 2. Description of the Prior Art Recording instruments of the system which performs recording by contacting directly an aqueous ink with a material to be recorded on such as paper, are generally so called writing implements such as a fountain pen, felt pen, aqueous ink charged ball point pen(hereinafter referred to as an "aqueous ball pen"), etc. Recently, an ink jet recording system wherein recording is performed by ejecting ink according to various systems has appeared, and it is attracting attention as a recording system capable of high speed and multi-color printing.

These recording instruments are constituted basically of a recording means for attaching ink to the material to be recorded on by various systems, an ink storage means for storing ink and an ink supplying system for supplying ink from the storage means to the recording means.

The ink supplying system is an important part for supplying ink continuously and momentarily to the recording means during recording, thereby smoothly effecting recording with ink. Generally speaking, the ink supplying system comprises a liquid chamber provided for the purpose of storing the ink supplied from an ink storage means such as an ink cassette and an ink passage for conveying ink through said liquid chamber to the recording means. In some cases, the ink storage means and the ink supplying system are integrally combined.

The material constituting the ink supplying system for the above recording instrument is required to be excellent in ink resistance at the contacting surface with the ink, and moreover to have characteristics necessary for continuous and smooth conveying of ink without stagnation of ink during recording. In addition, the material is also required to have characteristics for manufacturing such as easy working, molding and assembly, and the material is also chosen from these standpoints.

In the prior art, various resins, glasses and metals have been utilized as the constituting members. Several problems have been pointed out for these materials. For example, when the ink is supplied again to the recording means after stopping of recording for a long time or briefly, partly because the air bubbles tend to the attached at the liquid contacting surface of the ink supplying system with ink, ink discharging from the recording means may become unstable or discharging of ink may be interrupted sufficiently to bring about inability of ink discharging.

Such problems in ink supply are likely to occur particularly when the ink is used up and new ink is filled again, or when there is no presence of ink wholly or partially in the ink supplying system due to evaporation of a part of the ink solvent during interruption of recording for a long term. Also in an ink jet recording device, some problems occur. For example, when the ink in the ink supplying system is used up, it may be sometimes difficult to supplement the ink up to the discharging orifice, or even when filled according to an aspirating operation, air bubbles may be attached on the liquid contacting surface of the ink supplying system whereby no uniform filling throughout the whole ink supplying system is possible. As a result, troubles such as interruption of ink discharging or unstable ink discharging may be brought about during recording.

The above troubles in ink supply are observed particularly when a polymeric material such as polyethylene, polyester, silicone resin is used for the liquid contacting surface with ink of an ink supplying system in a recording instrument which performs recording with the use of ink. Its cause may be estimated to be based on insufficient wettability (ink affinity) of these constituent members of the ink supplying system.

As a method for solving this problem, modification treatment of the liquid contacting surface of the constituent member of the ink supplying system with ink is practiced. As general treatment methods, there may be employed, for example, a chemical treatment method in which treatment is carried out by using a solution of a powerful oxidizing agent such as $K_2Cr_2O_7$-$H_2SO_4$ and a physical treatment method by plasma treatment. The chemical treatment using a solution of a powerful oxidizing agent is dangerous, and further a significant cost is required for disposal of wastewater, thus involving much problems in aspects of safety and economy. On the other hand, according to the physical treatment by plasma treatment, low temperature treatment may be possible within a short time. For this reason, this method is also applicable even for an organic material with low melting point or transition point. Further, since it is a dry process, it is not necessary to conduct washing with a solvent and drying. In spite of these advantages, treatment of the inner wall surface of a slender and long tube or a material having a complicated shape is difficult, and the recording apparatus per se becomes very expensive. Thus, practical problems in applying this treatment method are involved. In particular, the member to be used in the ink supplying system for an ink jet recording device cannot be applied with sufficiently uniform treatment and therefore the physical treatment is not suitable for such a member.

The present invention has been accomplished as the result of extensive studies in view of the problems as discussed above.

SUMMARY OF THE INVENTION

An object of the present invention is to provide a recording instrument having an ink supplying system capable of performing ink supply to a recording means always continuously and smoothly by improvement of the insufficient ink affinity of the member to be used in the ink supplying system of a recording instrument by a simple surface treatment method.

According to one object of the present invention, there is to provide a recording instrument, comprising a recording means with an ink, an ink storage means and ink supplying system for supplying ink from said ink storage means to said recording means, characterized in that said ink supplying system has a liquid contacting surface comprising at least one of the components in a dye adsorbed on or penetrated into said surface.

According to another object of the present invention, there is to provide a recording instrument, comprising a recording means with an ink, an ink storage means and ink supplying system for supplying ink from said ink storage means to said recording means, characterized in that said ink supplying system has a liquid contacting surface comprising at least one of the components in a black dye adsorbed on or penetrated into said surface.

According to still another object of the present invention, there is to provide a recording instrument, comprising a recording means with an ink, an ink storage means and ink supplying system for supplying ink from said ink storage means to said recording means, characterized in that said ink supplying system has a liquid contacting surface comprising at least one compound having at least one hydrophilic group selected from the group consisting of amino group, hydroxyl group, carbonyl group, sulfone group and sulfanate group adsorbed on or penetrated into said surface.

DESCRIPTION OF THE PREFERRED EMBODIMENTS

Specific examples of the recording instrument of the present invention may include writing implements such as a fountain pen, felt pen, aqueous ball pen, etc., ink jet recording devices and others. These recording instruments perform writing by attaching an ink through direct contact of a recording means such as a pen point or an ink discharging outlet with a material to be recorded thereon or by formation of flying droplets, and consist basically of a recording means and an ink supplying system. The ink supplying system generally comprises a liquid chamber provided primarily for the purpose of supplying ink which is supplied from an ink storage means such as an ink cassette and an ink supplying passage for supplying ink from the ink storage means via the liquid chamber to the recording means.

Referring now to the accompanying drawings, specific examples of the above recording instrument are to be described.

Figure 1:
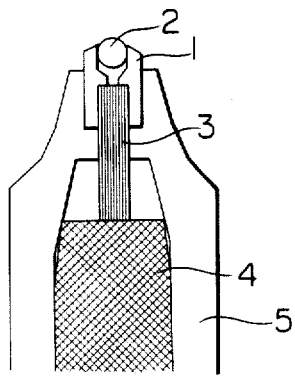
FIG. 1 is a sectional view of an example of the structure of an aqueous ball pen.

FIG. 1 is a sectional view of an aqueous ball pen. The aqueous ball pen performs writing by leading the ink within the ink absorber 4 (ink storage part) in a casing 5 through the fibrous ink leading core 3 by capillary phenomenon to the end of the tip 1 and discharging ink in an appropriate amount continuously by rotation of the ball 2 on the material to be recorded thereon. Of the respective constituent parts of the aqueous ball pen, the ink absorber 4 corresponds to the ink storage means according to the invention, the tip 1, the ball 2 and the ink leading core 3 correspond to the ink supplying system as herein mentioned. The part corresponding to the recording means is the contacted portion between the ball 2 and the material to be recorded on (not shown).

Figure 2:
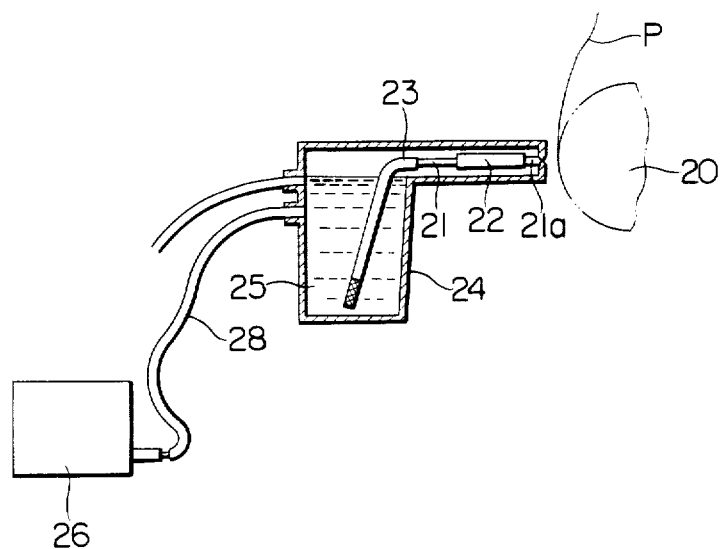
FIG. 2 is a schematic sectional view of an ink jet recording device.
Figure 3:
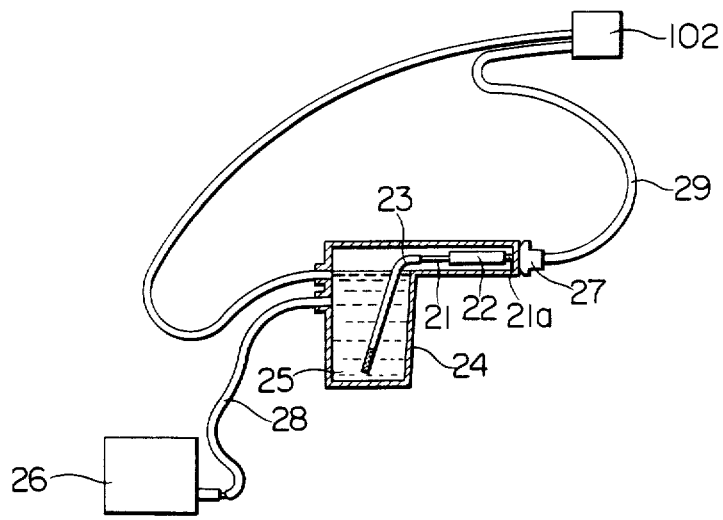
FIG. 3 is a schematic sectional view of an ink jet recording device equipped with a recovery pump.

FIG. 2 is a schematic sectional view of an ink jet recording device. This recording device performs recording by supplying the ink stored in the main ink tank 26 through an ink supplying system, namely the ink supplying tubes 23, 28 and the ink sub-tank to the ink jet nozzle 21 and permitting the ink 25 to fly as small liquid droplets from the nozzle 21a onto the recording paper P delivered a the paper conveying roller 20. The ink storage means as herein mentioned corresponds to the main ink tank 26 in the ink jet recording device, the ink supplying device to the ink jet nozzle, the ink sub-tank 24 and the ink supply tubes 23, 28, and the recording means to the nozzle 21a, respectively. In FIG. 3, 27 shows a cap, 29 an aspirating tube and 102 a recovery pump, respectively.

In the ink supplying system of the present invention, any member of the constituent members of the ink supplying system insufficient in wettability with ink is treated at its liquid contacting surface with ink with a solution for imparting ink affinity to be improved in compatibility with ink. The constituent members for such ink supplying system may include polymeric materials conventionally used such as polyethylene, polypropylene, polyacetal, polyester, silicone resin, polyvinyl chloride, polyvinylidene chloride, PMMA, polystyrene, ABS resin, AS resin and the like.

The treatment for imparting ink affinity to the liquid contacting surface may be practiced by dipping a member to be used for the ink supplying system in a solution for treatment prepared by dissolving a dye or at least one compound having at least one hydrophilic group in a solvent composed primarily of water for several seconds or longer, preferably several minutes or longer. For enhancement of the treatment effect, the treatment may be carried out under heating and pressurizing conditions unless heating would cause a modification or damaging of the material constituting the member. By such a dipping treatment, at least one part of the components contained in the compound having a hydrophilic group or a dye can be adsorbed on or penetrated into the member surface through some chemical or physical attractive force or penetration of said components into the voids between the polymeric molecular structures of the member to be at least retained on the treated surface. The ink affinity of the member may be estimated to be enhanced according to such a mechanism. In practice, the member to be treated is colored, particularly when employing a dye, whereby it can be confirmed that these components are sufficiently retained on the member.

The dyes to be utilized for the above treatment for imparting ink affinity may be inclusive of most of the dyes employed in general. Preferable examples are direct dyes, acidic dyes and basic dyes which are water soluble. Commercially available products may include Direct Pure Yellow 5G, Sirius Yellow GC, Sumilite Orange G Conc, Dialumionusrubin B, Sumilite Supra Red-Violet RL, Direct Skyblue 6B, Sumilite Supra Turquoise-Blue Conc, Diacupro Green G, Benzocatechine G, Kayaku Acid Brilliant Flavin FF, Metanil Yellow YK, Sumilan Orange G Extra Conc, Suminol Levelling Red 6BL Extra Conc, Aizen Erythrosine, Alizarin Rubinol R, Eisen Eosin GH Conc, Anthraquinone Violet 1149, Suminol Levelling Blue AGG, Carbolan Green G, Alizarin Light Brown BL 190%, Nigrosine NB Conc, Direct Deep Black XA, Kayaku Direct Special Black AXN, Water Black #187, Direct Deep Black XA (S), Water Black #100, #200, #300, Dia Black 300 H, Kayaku Black G Conc, Special Black G, Direct Black G Conc, Diacotton Fast Black D, Direct Fast Black D, Japanol Fast Black D Conc, Direct Fast Black B, Direct Deep Black Conc Special, Suminol Milling Black VLG, Sumilan Black WA, Dialeather Black B, and so on.

The dye concentration of the solution for treatment during the treatment for imparting ink affinity may be 0.1% by weight or more, preferably 0.2% by weight or more based on a dye solution.

Among these dyes, black dyes are particularly effective for the object of the present invention. For such black dyes, most of the black dyes generally employed are effective. Particularly preferred are direct black dyes, including C.I. Direct Black 154, such as Direct Deep Black XA (produced by Mitsubishi Kasei), Kayaku Direct Special Black AXN (produced by Nippon Kayaku), Direct Deep Black XA S (produced by Sumitomo Kagaku), Daiwa Black 1000 (produced by Daiwa Kasei), Water Black #187 (produced by Orient Kagaku), etc.; C.I. Direct Black 19, such as Water Black #100, #200 and #300 (produced by Orient Kagaku), Daiwa Black 300 H (produced by Daiwa Kasei), Kayaku Black G Conc (produced by Nippon Kayaku), Special Black G (produced by Bayer), Direct Black G Conc (produced by Chugai Kasei), etc.; C.I. Direct Black 17, such as Diacotton Fast Black D (produced by Mitsubishi Kasei), Direct Fast Black D (produced by Nippon Kayaku), Japanol Fast Black D Conc (produced by Sumitomo Kagaku), etc.; C.I. Direct Black 22, such as Direct Fast Black B (produced Hodogaya Kagaku, Nippon Kayaku, Mitsubishi Kasei and Sumitomo Kagaku), etc.; C.I. Direct Black 38 such as Direct Deep Black Conc Special (produced by Sumitomo Kagaku); and the like, and black acidic dyes such as Suminol Milling Black VLG (produced by Sumitomo Kagaku), Sumilan Black WA (produced by Sumitomo Kagaku), Dialeather Black B (produced by Mitsubishi Kasei), etc.

The compound having a hydrophilic group to be used in the present invention has at least one hydrophilic group selected from amino group, hydroxyl group, carboxyl group, sulfone group and sulfonate base group, and has the characteristic to be at least retained on the treated surface by adsorption on or penetration into the surface of the aforesaid constituent member for the ink supplying system. Preferable examples may include aromatic compounds containing at least one of the above hydrophilic groups, such as benzene derivatives, naphthalene derivatives, anthracene derivatives, biphenyls, or aromatic compounds formed by a condensation of two or more of these aromatic nuclei. More preferably, the above aromatic groups having at least one amino group may be employed. Particularly preferable compounds have the structural formulae as shown below.

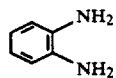 No. 1

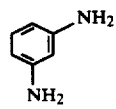 No. 2

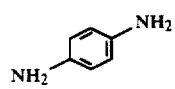 No. 3

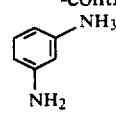 No. 4

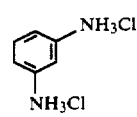 No. 5

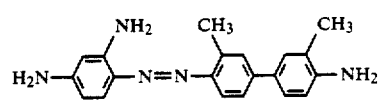 No. 6

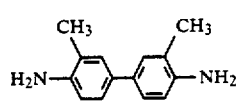 No. 7

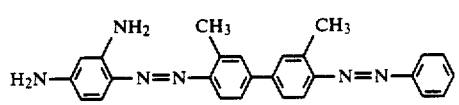 No. 8

 No. 9

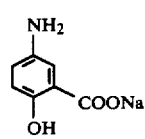 No. 10

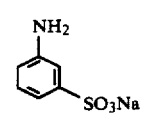 No. 11

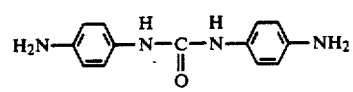 No. 12

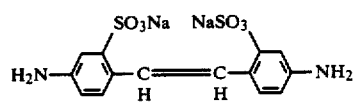 No. 13

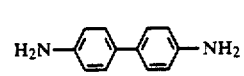 No. 14

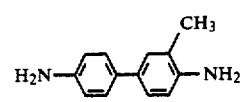 No. 15

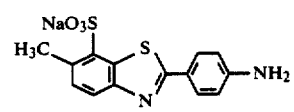 No. 16

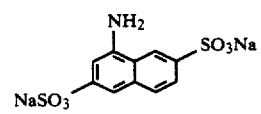 No. 17

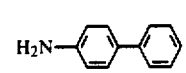 No. 18

-continued

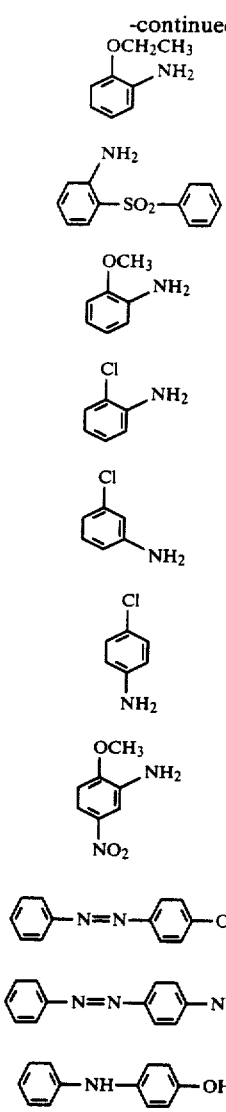

No. 19
No. 20
No. 21
No. 22
No. 23
No. 24
No. 25
No. 26
No. 27
No. 28

The treating solution of these compounds can be prepared by dissolving at least one compound in an amount of 0.1% by weight or more, preferably 0.2% by weight or more, based on the solution, in a solvent primarily composed of water.

The solvent component constituting the treating solution may be water or a mixture of water with various kinds of water soluble organic solvents. Examples of various kinds of organic solvents are alkyl alcohols having 1 to 4 carbon atoms, such as methyl alcohol, ethyl alcohol, n-propyl alcohol, isopropyl alcohol, n-butyl alcohol, sec-butyl alcohol, tert-butyl alcohol, isobutyl clcohol, and the like; amides such as dimethylformamide, dimethylacetamide and the like; ketones or ketoalcohols such as acetone, diacetone alcohol and the like; ethers such as tetrahydrofuran, dioxane and the like; polyalkyleneglycols such as polyethyleneglycol, polypropyleneglycol and the like; alkyleneglycols of which alkylene group contains 2 to 6 carbon atoms, such as ethyleneglycol, propyleneglycol, butyleneglycol, triethyleneglycol, 1,2,6-hexanetriol, thiodiglycol, hexyleneglycol, diethyleneglycol and the like; glycerine; lower alkylethers of polyalcohols such as ethyleneglycol methyl ether, diethyleneglycol methyl (or ethyl) ether, triethyleneglycol monomethyl (or ethyl) ether and the like; nitrogen containing heterocyclic ketones such as N-methyl-2-pyrollidone, 1,3-dimethyl-2-imidazolidinone and the like.

The treating solution may also incorporate a dissolving agent for enhancement of the solubility of the above compound.

In the ink supplying system having a liquid contacting surface enhanced in wettability with ink according to the treatment for imparting ink affinity as described above, ink can be supplied continuously and smoothly. Besides, after interruption of recording over a long time, ink supplying performance can be excellently recovered. In a recording instrument having such an ink supplying system, improvements can be effected with respect to the supplying troubles recognized in the instruments of the prior art such as instability of ink discharging, intermittent failure of ink discharging, inability of ink discharging, etc.

The present invention is described in more detail by referring to reference examples, comparative examples and working examples.

REFERENCE EXAMPLE 1

As a constituent member of an ink supplying system, a polyethylene sheet generally employed (produced by Mitsui Polychemical) was thoroughly washed with trichloroethane, dried and dipped in a treating solution of a black dye (C.I. Direct Black 154; Water Black 187-L, produced by Orient Kagaku) formulated to the composition as shown in Table 1 under the temperature condition of 60° C. The coloration of the polyethylene sheet was observed and also the contact angles of the polyethylene sheet with an ink immediately before dipping and after dipping 1, 2 and 24 hours were measured.

TABLE 1

| Water | 94 parts by weight |
|---|---|
| N—methyl-2-pyrrolidone | 4 parts by weight |
| C.I. direct Black 154 | 2 parts by weight |

Measurement of contact angle was conducted by adding one drop of small ink droplet on the surface of a sample held horizontally and, after leaving it to stand stationarily for 5 minutes, observing by a microscope the angle formed between the sample surface and the tangential line drawn on the liquid drop at the intersected point of the sample sheet surface with the liquid droplet added on the sample surface.

The contact angle is defined by the mutual relation between the sample sheet and the physical properties of the liquid droplet, and reduction in contact angle under the same conditions represents improvement of affinity of the sample for the liquid.

The inks employed for the above contact angle measurements were prepared by dissolving the four kinds of dyes of Water Black #300 (produced by Orient Kagaku), Kayarus Turquoise Blue GL (produced by Nippon Kayaku), Aizen Acid Phloxine P.B (produced by Hodogaya Kagaku) and Direct Naphthol Yellow S (produced by Daiwa Kasei) in a solvent to the composition shown below.

| Water | 84 parts by weight |
|---|---|
| Diethyleneglycol | 10 parts by weight |
| N—methyl-2-pyrrolidone | 4 parts by weight |

-continued

| Dye | 2 parts by weight |
|---|---|

The measurement results are shown in Table 2. The polyethylene sheet was colored in yellow, the contact angle was reduced by dripping for one hour or longer. Thus, the polyethylene sheet was effectively treated and endowed with ink affinity.

TABLE 2

| Ink | Viscosity (dyn/cm) | Contact angle (Degree) Dipping time | | | |
|---|---|---|---|---|---|
| | | 0 min. | 1 hr. | 2 hrs. | 24 hrs. |
| Black (Water Black #300) | 45.2 | 83 | 36 | 38 | 33 |
| Cyan (Kayarus Turquoise Blue GL) | 43.5 | 85 | 37 | 38 | 37 |
| Magenta (Aizen Acid Phloxinic PB) | 44.6 | 87 | 40 | 38 | 35 |
| Yellow (Daiwa Naphthol Yellow S) | 46.0 | 86 | 37 | 39 | 37 |

REFERENCE EXAMPLE 2

A polyethylene tube of 0.76 mm in inner diameter, 1.22 mm in outer diameter and 320 mm in length was dipped in a solution formulated similarly as the composition shown in Table 1 except for using the C.I. Direct Black 154 in place of the same amount of Direct Black 19 under the temperature condition of 60° C. overnight, throughly washed with water and dried. Then, the tube was cut and the state of coloration on the inner wall was observed. The tube surface was recognized to be colored uniformly over the whole H) surface, which might be considered to be due to adsorption of a part of the dye constituents.

REFERENCE EXAMPLE 3

The polyethylene sheet subjected to the dipping treatment for one hour in Reference example 1 was washed with an ultrasonic cleaning machine (C-4352 produced by Kaijo Denki K.K., output: 100 W, oscillating frequency: 26 KHz) in an ink solvent. For the washing time of 60 minutes, the change in contact angle was measured periodically. The measurement results are shown in FIG. 4.

Figure 4:
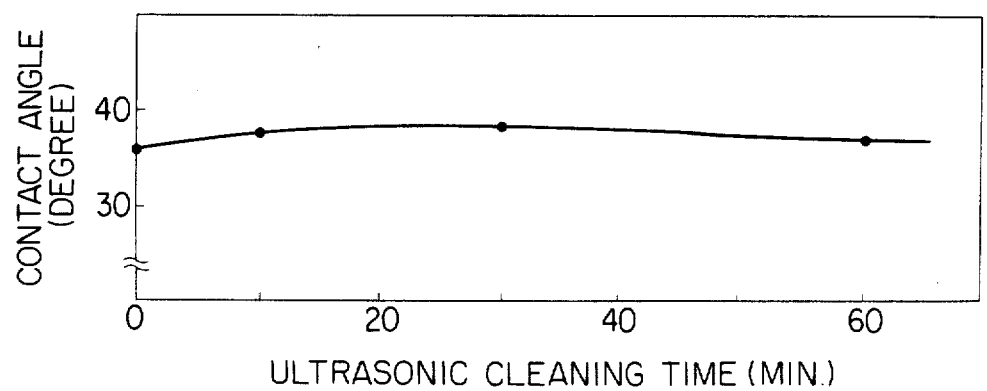
FIG. 4 is a graph showing the change with lapse of time of the contact angle between the polyethylene sheet and the ink solution when a polyethylene sheet is subjected to ultrasonic washing in an ink solvent according to reference example 3.

In FIG. 4, the contact angle was not substantially changed, the dye was adsorbed stably and the effect of the treatment for imparting ink affinity was sufficiently persistent.

EXAMPLE 1

By use of an aqueous ball pen as the recording instrument, the treatment for imparting ink affinity was practiced for the ink supplying system in the aqueous ball pen. The treatment for imparting ink affinity was applied by dipping the tip 1 and the ball 2 (made of polyacetal) in the sectional view shown in FIG. 1 in a solution for ink affinity imparting treatment at 60° C. for one hour, followed by thoroughly washing with water and drying. By use of the thus treated tip 1 and ball 2, 10 sets of aqueous ball pens was shown in FIG. 1 were assembled. These aqueous ball pens were filled with an ink having the composition shown below and 1000 m continuous recording test was practiced (recording speed: 10 cm/sec., recording paper: high quality paper, one stroke writing).

| Water | 84 parts by weight |
|---|---|
| Diethyleneglycol | 10 parts by weight |
| N—methyl-2-pyrrolidone | 4 parts by weight |
| Daiwa Naphthol Yellow S | 2 parts by weight |

For the lines recorded, recording quality such as line narrowing and line cutting, was observed and the results were shown in Table 3. In all the aqueous ball pens employing the tip ball subjected to ink affinity imparting treatment, the ink supply was found to be very good without occurrence of line narrowing or line cutting.

COMPARATIVE EXAMPLE 1

Ten sets of aqueous ball pens were similarly assembled as in Example 1 by use of the tip 1 and the ball 2 which were not subjected to ink affinity imparting treatment, and recording tests were conducted and recording quality were observed according to the procedure of Example 1 to obtain the results shown in Table 3.

TABLE 3

| | Good quality | Bad quality | |
|---|---|---|---|
| | | Line narrowing | Line cutting |
| Example 1 | 10 pens | 0 pen | 0 pen |
| Comparative Example 1 | 0 pen | 3 pens | 7 pens |

EXAMPLE 2

The ink affinity imparting treatment was practiced on the ink supplying system of an ink jet recording device and a device was assembled by use thereof. Of the ink supplying system in the ink jet recording device shown in FIG. 2, the ink supplying tubes 23 and 28 (polyethylene tubes, 0.76 mm in inner diameter, 1.22 mm in outer diameter) were dipped in the ink affinity imparting solution employed in Reference example 1, thoroughly washed with water and dried. The inner surfaces of these tubes were found to be colored in yellowish brown. A device was assembled by use of these tubes and the ink supply-recovery test was practiced after exchange of the main ink tank 26.

The ink supply-recovery test was conducted by use of the recovery pump 102 as shown in FIG. 3, by aspirating the ink through the ink aspirating tube 29 and the cap 27 from the nozzle 21a, expelling completely the bubbles within the ink supplying system (the ink jet nozzle 21, the ink supplying tubes 23 and 28) out of the system and measuring the number of aspirations by the pump until good ink supplying was performed. The measurement results are given in Table 4.

COMPARATIVE EXAMPLE 2

By using the ink supplying system member not subjected to the ink affinity imparting treatment, a similar ink jet recording device to Example 2 was assembled and the ink supply-recovery test was conducted according to the procedure of Example 2. The test results are shown in Table 4.

TABLE 4

| Conditions | Applied number of recovery pump aspirations | |
|---|---|---|
| | Example 2 | Comparative example 2 |
| Ink was remaining in the ink sub-tank 24 | 1-2 | 5-10 |
| No ink was remaining in the ink sub-tank 24, the ink jet nozzle 21 and the ink supplying tubes 23, 28 | 3-5 | 10-15 |

REFERENCE EXAMPLE 4

As a constituent member of an ink supplying system, a polyethylene sheet generally employed (produced by Mitsui Polychemical) was thoroughly washed with trichloroethane, dried and dipped in an ink affinity imparting solution of a dye formulated by dissolving in a solvent comprising water and N-methyl-2-pyrrolidone to the composition as shown below under the temperature condition of 60° C. for 24 hours.

| | |
|---|---|
| Water | 94 parts by weight |
| N—methyl-2-pyrrolidone | 4 parts by weight |
| C.I. Direct Black 154 | 2 parts by weight |

As the dye components in the treating solution, five kinds of dyes, namely, C.I. Acid Red 35 (Diacid Supra Red 3B, produced by Mitsubishi Kasei), C.I. Acid Brown 4 (Solar Brown RKX, produced by Sumitomo Kagaku), C.I, Direct Red 28 (Congored, produced by Mitsubishi kasei), G.I. Direct Blue 2 (Direct Blue BH, produced by Sumitomo Kagaku), G.I. Direct Blue 86 (Sumilight Supra Turquoise Blue G Conc, produced by Sumitomo Kagaku) were employed individually.

After dipping treatment, the polyethylene sheet was thoroughly washed with water, followed by drying, and the contact angle with an ink having the following composition was measured.

| | |
|---|---|
| Water | 84 parts by weight |
| Diethyleneglycol | 10 parts by weight |
| N—methyl-2-pyrrolidone | 4 parts by weight |
| Daiwa Naphthol Yellow S (produced by Daiwa Kasei) | 2 parts by weight |

Measurement of contact angle was conducted by adding one drop of small ink droplet on the surface of a sample held horizontally and, after left to stand stationarily for 5 minutes, observing by a microscope the angle formed between the sample surface and the tangential line drawn on the liquid drop at the intersected point of the sample sheet surface with the liquid droplet added on the sample surface.

The contact angle is defined by the mutual relation between the sample and the physical properties of the liquid droplets, and reduction in contact angle under the same conditions represents improvement of affinity of the sample for the liquid.

The measurement results were shown in Table 4. In Table 4, for comparative purpose, the polyethylene sheet was subjected to the same dipping treatment except for adding water in place of the dye in the above treatment solution and contact angle was measured therefor to obtain the result as shown by Blank.

TABLE 4

| Treating solution | Dye contained | Contact angle (Degree) |
|---|---|---|
| No. 101 | C.I. Acid Red 35 | 47 |
| No. 102 | C.I. Acid Brown 4 | 45 |
| No. 103 | C.I. Direct Red 28 | 40 |
| No. 104 | C.I. Direct Blue 2 | 41 |
| No. 105 | C.I. Direct Blue 86 | 45 |
| — | Blank | 86 |

REFERENCE EXAMPLE 5

Ink affinity imparting solutions were prepared by dissolving intermediates for the dyes in place of the dyes in a solvent to the composition as shown below. As the intermediate for the dyes, o-toluidine and benzidine were used individually.

| | |
|---|---|
| Water | 94 parts by weight |
| N—methyl-2-pyrrolidone | 4 parts by weight |
| Dye intermediate | 2 parts by weight |

By use of the above solution for imparting ink affinity, the polyethylene sheet was treated similarly as in Reference example 4, and the contact angle was measured. The results were shown in Table 5. The Blank in Table 5 was the result obtained for the treatment with a solution in which water was added in place of the dye intermediates.

TABLE 5

| Dye intermediate in the treating solution | Contact angle (Degree) |
|---|---|
| o-toluidine | 56 |
| benzidine | 52 |
| Blank | 86 |

EXAMPLE 3

By use of an aqueous ball pen as the recording instrument, the treatment for imparting ink affinity was practiced for the ink supplying system in the aqueous ball pen. The treatment for imparting ink affinity was applied by dipping the tip 1 and the ball 2 (made of polyacetal) in the sectional view shown in FIG. 1 in a solution for ink affinity imparting treatment at 60° C. for one hour, followed by thoroughly washing with water and drying. By use of the thus treated tip 1 and ball 2, 10 sets or aqueous ball pens as shown in FIG. 1 were assembled. These aqueous ball pens were filled with an ink having the composition shown below and 1000 m continuous recording test was practiced (recording speed: 10 cm/sec, recording paper: high quality paper, one stroke writing).

| | |
|---|---|
| Water | 84 parts by weight |
| Diethyleneglycol | 10 parts by weight |
| N—methyl-2-pyrrolidone | 4 parts by weight |
| Daiwa Naphthol Yellow S | 2 parts by weight |

For the lines recorded, recording quality such as line narrowing and line cutting was observed and the results are shown in Table 6 together with the results of Comparative example 1.

TABLE 6

| | Good quality | Bad quality | |
| --- | --- | --- | --- |
| | | line narrowing | line cutting |
| Example 3: | | | |
| Treating solution No. 102 | 7 pens | 3 pens | 0 pen |
| Treating solution No. 103 | 8 pens | 2 pens | 0 pen |
| Comparative example 1 | 0 pen | 3 pens | 7 pens |

EXAMPLE 4

The ink affinity imparting treatment was practiced on the ink supplying system of an ink jet recording device and a device was assembled by use thereof. Of the ink supplying system in the ink jet recording device shown in FIG. 2, the ink supplying tubes 23 and 28 (polyethylene tubes, 0.76 mm in inner diameter, 1.22 mm in outer diameter) were dipped in the ink affinity imparting solution Nos. 101, 104 and 105 employed in Reference example 4, thoroughly washed with water and dried. The inner surfaces of these tubes were found to be colored in yellowish brown. A device was assembled by use of these tubes and the ink supply-recovery test was practiced after exchange of the main ink tank 26.

The ink supply-recovery test was conducted by use of the recovery pump 102 as shown in FIG. 3, by aspirating the ink through the ink aspirating tube 29 and the cap 27 from the nozzle 21a, expelling completely the bubbles within the ink supplying system (the ink jet nozzle 21, the ink supplying tubes 23 and 28) out of the system and measuring the number of aspirations by the pump until good ink supplying was performed. The measurement results are given in Table 7 together with the results of Comparative example 2.

TABLE 7

| | Applied number of recovery pump aspiration | | | |
| --- | --- | --- | --- | --- |
| | Example 4 | | | Comparative example 2 |
| Conditions | Treating soln. No. 101 | Treating soln. No. 104 | Treating soln. No. 105 | |
| Ink 25 is remaining in the sub-tank 24 | 2–4 | 1–3 | 2–4 | 5–10 |
| No ink is remaining in the sub-ink tank 24, the ink jet nozzle 21 and the ink supplying tubes 23, 28 | 4–8 | 3–7 | 4–8 | 10–15 |

REFERENCE EXAMPLE 6

After a polyvinylidene chloride sheet (produced by Kureha Plastic) was thoroughly washed and dried, it was subjected to the treatment for imparting ink affinity by dipping in a treating solution prepared by adding either one of the compounds selected from the groups consisting of the compounds the chemical structures as mentioned above, namely, No. 1–No. 3; a mixture of No. 4 and No. 5; No. 6; No. 10–No. 13; and No. 16–No. 17 in a solvent comprising water and N-methyl-2-pyrrolidone (composition: 30 parts by weight of water and 30 parts by weight of N-methyl-2-pyrrolidone) in an amount of 1% by weight, at 60° C. for one hour, followed by washing with water and drying.

The contact angle of the polyvinylidene chrolide sheet with an ink having the following composition was measured. The inks employed contained four kinds of dyes, respectively, of Water Black #300 (produced by Orient Kagaku), Kayaku Turquoise Blue GL (produced by Nippon Kayaku), Aizen Acid Phloxine PB (produced by Hodogaya Kagaku) and Daiwa Naphthol Yellow S (produced by Daiwa Kasei).

| | |
| --- | --- |
| Water | 84 parts by weight |
| Diethyleneglycol | 10 parts by weight |
| N—methyl-2-pyrrolidone | 4 parts by weight |
| Dye | 2 parts by weight |

Measurement of contact angle is conducted by adding one ink droplet on the surface of a sample held horizontally and, after being left to stand stationary for 5 minutes, observing by a microscope the angle formed between the sample surface and the tangential line drawn on the liquid drop at the intersected point of the sheet surface with the liquid droplet added on the sample surface.

The contact angle is defined by the mutual relation between the sample and the physical properties of the liquid droplet, and reduction in contact angle under the same conditions represents improvement of affinity of the sample for the liquid.

The measurement results of the contact angles of the polyvinylidene chrolide sheets treated with the respect solutions are shown in Table 8. In Table 8, Blank is the result of measurement of the contact angle when the sheet was treated in the same manner with a solvent consisting only of water and N-methyl-2-pyrrolidone having the above composition.

TABLE 8

| Ink used for treatment (dye) | Viscosity (dye/cm) | Contact angle (degree) | | | | | | | | | | | |
| --- | --- | --- | --- | --- | --- | --- | --- | --- | --- | --- | --- | --- | --- |
| | | Compound No. | | | | | | | | | | | |
| | | Blank | No. 1 | No. 2 | No. 3 | No. 4 + 5 | No. 6 | No. 10 | No. 11 | No. 12 | No. 13 | No. 16 | No. 17 |
| Black (Water Black #300) | 45.0 | 73 | 48 | 44 | 44 | 45 | 43 | 42 | 46 | 45 | 47 | 46 | 47 |
| Cyan (Kayaku Turquoise Blue GL) | 44.0 | 75 | 49 | 45 | 45 | 42 | 45 | 45 | 47 | 45 | 45 | 45 | 44 |
| Magenta (Aizen Acid P.B.) | 44.6 | 72 | 47 | 46 | 46 | 44 | 47 | 44 | 44 | 47 | 44 | 48 | 45 |
| Yellow (Daiwa Naphthol Yellow S) | 45.0 | 74 | 44 | 45 | 45 | 44 | 46 | 44 | 45 | 44 | 43 | 45 | 43 |

REFERENCE EXAMPLE 7

The process of the Reference example 6 was repeated except for using a polyvinylidene chloride sheet in replace of a polyacetal sheet (produced by Du Pont de Nemours & Co.). The contact angles for four kinds of inks were measured. The solutions for imparting ink affinity were prepared following the procedure of Reference example 6, by using one of the compounds selected from the group consisting of the compounds having the chemical formulae as mentioned above of No.7–No.9, No.14–No.15, No.20–No.22 and No.26–No.28, in the same solvent in an amount of 1% by weight. The results are shown in Table 9.

from the group consisting of the compounds having the formulae as set forth above of No.20–No.22 and No.26–No.28, they were dipped at 60° C. for one hour, followed by thoroughly washing with water and drying. By use of the thus treated tip 1 and ball 2, 10 sets of aqueous ball pens as shown in FIG. 1 were assembled. The ink absorber of this aqueous ball pen was filled with an ink having the composition shown below.

| | |
|---|---|
| Water | 84 parts by weight |
| Diethyleneglycol | 10 parts by weight |
| N—methyl-2-pyrrolidone | 4 parts by weight |
| Daiwa Naphthol Yellow S | 2 parts by weight |

TABLE 9

| Ink used for treatment (dye) | Viscosity (dye/cm) | Contact angle (degree) | | | | | | | | | | | |
|---|---|---|---|---|---|---|---|---|---|---|---|---|---|
| | | Blank | No. 7 | No. 8 | No. 9 | No. 14 | No. 15 | No. 20 | No. 21 | No. 22 | No. 26 | No. 27 | No. 28 |
| Black (Water Black #300) | 45.0 | 70 | 42 | 44 | 41 | 43 | 38 | 42 | 41 | 43 | 44 | 42 | 46 |
| Cyan (Kayaku Turquoise Blue GL) | 44.0 | 72 | 41 | 44 | 40 | 40 | 38 | 43 | 40 | 40 | 46 | 44 | 47 |
| Magenta (Aizen Acid P.B.) | 44.6 | 70 | 43 | 43 | 42 | 39 | 40 | 40 | 42 | 42 | 46 | 43 | 45 |
| Yellow (Daiwa Naphthol Yellow S) | 45.0 | 71 | 42 | 42 | 44 | 38 | 39 | 41 | 42 | 41 | 47 | 41 | 45 |

REFERENCE EXAMPLE 8

In the solvent comprising the same composition of water and N-methyl-2-pyrrolidone as in Reference example 6, each 1% by weight of each one of the compounds selected from the group consisting of the compounds having the formulae as mentioned above of No.1–No.3, No.18, No.19 and No.23–No.25 and a mixture of No.4 and No.5 was dissolved to prepare a solution for treatment, and each solution was applied for imparting ink affinity on the same polyvinylidene chloride sheet as used in Reference example 6. The contact angles were measured to obtain the results shown in Table 10.

For the lines recorded, recording quality such as line narrowing and line cutting was observed and the results are shown in Table 11 together with the results of Comparative example 1. In all the aqueous ball pens employing the tip 1 and the ball 2 subjected to the ink affinity imparting treatment, the ink supply is very good without occurrence of line narrowing or line cutting.

TABLE 11

| | | Bad quality | |
|---|---|---|---|
| | Good quality (pens) | Line narrowing (pens) | Line cutting (pens) |
| Example 5: | | | |
| Compound No. 20 | 10 | 0 | 0 |
| Compound No. 21 | 10 | 0 | 0 |
| Compound No. 22 | 10 | 0 | 0 |
| compound No. 26 | 10 | 0 | 0 |
| Compound No. 27 | 10 | 0 | 0 |
| Compound No. 28 | 10 | 0 | 0 |
| Comparative example 1 | 0 | 3 | 7 |

TABLE 10

| Ink used for treatment (Dye) | Viscosity (dye/cm) | Contact angle (degree) | | | | | | | | |
|---|---|---|---|---|---|---|---|---|---|---|
| | | Blank | No. 1 | No. 2 | No. 3 | No. 18 | No. 19 | No. 23 | No. 24 | No. 25 |
| Black (Water Black #300) | 45.0 | 73 | 38 | 37 | 36 | 39 | 38 | 36 | 37 | 40 |
| Cyan (Kayaku Turquoise Blue GL) | 44.0 | 75 | 39 | 36 | 37 | 40 | 39 | 36 | 38 | 39 |
| Magenta (Aizen Acid P.B.) | 44.6 | 72 | 35 | 37 | 36 | 38 | 36 | 38 | 37 | 38 |
| Yellow (Daiwa Naphthol Yellow S) | 45.0 | 74 | 39 | 39 | 35 | 37 | 37 | 36 | 38 | 38 |

EXAMPLE 5

By use of an aqueous ball pen as the recording instrument, the treatment for imparting ink affinity was practiced for the ink supplying system in the aqueous ball pen. For the treatment for imparting ink affinity, the tip 1 and the ball 2 (made of polyacetal) in the sectional view shown in FIG. 1 were employed in Reference example 7. Among the treating solutions, in each of the solutions employing one of the compounds selected

EXAMPLE 6

The ink affinity imparting treatment was practiced on the ink supplying system of an ink jet recording device and a device was assembled by use thereof. Of the ink supplying system in the ink jet recording device shown in FIG. 2, the ink supplying tubes 23 and 28 (polyethylene tubes, 0.76 mm in inner diameter, 1.22 mm in outer diameter) were subjected to the treatment for imparting ink affinity by dipping each in an ink affinity imparting solution selected from those employed in Reference example 6 prepared by use of the compounds having the formulae as mentioned above of No.1-No.3, No.6, No.12 and No.17, at 60° C. for 24 hours, thoroughly washed with water and dried. The inner surfaces of these tubes were found to be colored in yellowish brown. A device was assembled by use of these tubes and the ink supply-recovery test was practiced after exchange of the main ink tank 26.

The ink supply-recovery test was conducted by use of the recovery pump 102 as shown in FIG. 3, by aspirating the ink through the ink aspirating tube 29 and the cap 27 from the nozzle 21a, expelling completely the bubbles within the ink supplying system (the ink jet nozzle 21, the ink supplying tubes 23 and 28) out of the system and measuring the number of aspirations by the pump until good ink supplying was performed. The measurement results are given in Table 12 together with the results of Comparative example 2.

TABLE 12

| | Applied number of recovery pump aspirations | | | | | | |
|---|---|---|---|---|---|---|---|
| | Example 6 Compound No. | | | | | | Comparature |
| conditions | No. 1 | No. 2 | No. 3 | No. 6 | No. 12 | No. 17 | example 2 |
| Ink was remaining in the ink sub-tank 24 | 1-3 | 1-2 | 1-3 | 1-2 | 2-3 | 1-3 | 5-10 |
| No ink was remaining in the ink sub-tank 24, the ink jet nozzle 21 and the ink supplying tubes 23, 28 | 4-5 | 3-4 | 4-5 | 3-4 | 4-5 | 4-5 | 10-15 |

What we claim is:

1. A method of making a recording instrument, comprising the steps of:
    providing a recording instrument including recording means for recording with ink, ink storage means and an ink supplying system for supplying ink from said ink storage means to said recording means, said ink supplying system having an ink contracting surface; and
    exposing said ink contacting surface to an aqueous solution of at least one of the components in a dye or to an aqueous solution of a compound having at least one hydrophilic group, such component or compound having the ability to be retained on said ink contacting surface by absorption thereon or penetration thereinto, wherein said exposing step includes bringing said ink contacting surface into contact with the solution at an elevated temperature.

2. A method according to claim 1, wherein said exposing step includes maintaining said ink contacting surface in contact with the solution for at least about one hour.

3. A method according to claim 1, wherein the elevated temperature is about 60° C.

4. A method according to claim 1, wherein the component is a component of black dye.

5. A method according to claim 1, wherein said ink contacting surface comprises a material selected from the group consisting of polyethylene, polypropylene, polyacetal, polyester, silicone resin, polyvinyl chloride, polyvinylidene chloride, PMMA, polystyrene, ABS resin and AS resin.

6. A method according to claim 1, wherein the hydrophilic group is selected from the group consisting of an amino group, a hydroxy group, a carboxyl group, a sulfone group and a sulfonate base group.

7. A method according to claim 6, wherein the hydrophilic group is contained in an aromatic compound selected from the group consisting of benzene, naphthalene or anthracene derivatives, and aromatic compounds formed by a condensation of two or more nuclei of such derivatives.

8. A method according to claim 1, wherein said aqueous solution includes an organic solvent selected from the group consisting of alkyl alcohols having 1 to 4 carbon atoms, amides, ethers, polyalkyleneglycols, alkyleneglycols with an alkylene group having 2 to 6 carbon atoms, glycerine, lower alkylethers of polyalcohols and nitrogen-containing heterocyclic ketones.

9. A method of making an ink-jet recording instrument, comprising the steps of:
    providing a recording instrument including recording means for recording with ink by ejecting the ink toward a recording medium, ink storage means and an ink supplying system for supplying ink from said ink storage means to said recording means, said ink supplying system having an ink contacting surface; and
    exposing said ink contacting surface to an aqueous solution of at least one of the components in a dye or to an aqueous solution of a compound having at least one hydrophilic group, such component or compound having the ability to be retained on said ink contacting surface by adsorption thereon or penetration thereinto, wherein said exposing step includes bringing said ink contacting surface into contact with the solution at an elevated temperature.

10. A method according to claim 9, wherein said exposing step includes maintaining said ink contacting surface in contact with the solution for at least about one hour.

11. A method according to claim 9, wherein the elevated temperature is about 60° C.

12. A method according to claim 9, wherein the component is a component of black dye.

13. A method according to claim 9, wherein said ink contacting surface comprises a material selected from the group consisting of polyethylene, polypropylene, polyacetal, polyester, silicone resin, polyvinyl chloride, polyvinylidene chloride, PMMA, polystyrene, ABS resin and AS resin.

14. A method according to claim 9, wherein the hydrophilic group is selected from the group consisting of an amino group, a hydroxyl group, a carboxyl group, a sulfone group and a sulfonate base group.

15. A method according to claim 14, wherein the hydrophilic group is contained in an aromatic compound selected from the group consisting of benzene, naphthalene or anthracene derivatives, and aromatic compounds formed by a condensation of two or more nuclei of such derivatives.

16. A method according to claim 9, wherein said aqueous solution includes an organic solvent selected from the group consisting of alkyl alcohols having 1 to 4 carbon atoms, amides, ethers, polyalkyleneglycols, alkyleneglycols with an alkylene group having 2 to 6 carbon atoms, glycerine, lower alkylethers of polyalcohols and nitrogen-containing heterocyclic ketones.

* * * * *

UNITED STATES PATENT AND TRADEMARK OFFICE
CERTIFICATE OF CORRECTION

PATENT NO. : 4,716,945                    Page 1 of 2
DATED : January 5, 1988
INVENTOR(S) : SEIICHI AOKI, ET AL.

It is certified that error appears in the above-identified patent and that said Letters Patent is hereby corrected as shown below:

COLUMN 3

Line 16, "sulfanate" should read --sulfonate--.

COLUMN 4

Line 2, "sub-tank" should read --sub-tank 24--.

COLUMN 5

Line 15, "XA S" should read --XA Ⓢ--.

COLUMN 9

Line 36, "H)" should be deleted.

COLUMN 11

Line 34, "G.I." should rad --C.I.--.
Line 35, "G.I." should rad --C.I.--.

COLUMN 14

Line 16, "chrolide" should read --chloride--.
Line 44, "chroride" should read --chloride--.
Line 44, "respect" should read --respective--.

UNITED STATES PATENT AND TRADEMARK OFFICE
CERTIFICATE OF CORRECTION

PATENT NO. : 4,716,945

DATED : January 5, 1988

INVENTOR(S) : SEIICHI AOKI, ET AL.

It is certified that error appears in the above-identified patent and that said Letters Patent is hereby corrected as shown below:

COLUMN 17

Lines 49-50, "contracting" should read --contacting--.
    Line 56, "absorption" should read --adsorption--.

Signed and Sealed this

Twenty-first Day of June, 1988

Attest:

DONALD J. QUIGG

Attesting Officer      Commissioner of Patents and Trademarks